Patented Feb. 9, 1954

2,668,816

UNITED STATES PATENT OFFICE 2,668,816

PROCESS FOR THE PREPARATION OF 17,20-HYDROXYKETONES OF THE PREGNANE SERIES AND NEW AND USEFUL COMPOUNDS OF THE SAID SERIES

Karl Miescher, Riehen, and Julius Schmidlin, Basel, Switzerland, assignors to Ciba Pharmaceutical Products, Inc., Summit, N. J.

No Drawing. Application February 5, 1951, Serial No. 209,516

Claims priority, application Switzerland February 10, 1950

8 Claims. (Cl. 260—397.45)

The present invention is concerned with the preparation of saturated and unsaturated 17,20-hydroxy-ketones of the pregnane series containing a free, esterified or etherified hydroxy group in the 21-position, and with certain new compounds of the said series.

Such hydroxy-ketones of the pregnane series are of very great importance. Thus, for example, cortisone—the $\Delta^4$-3,11,20-triketo-17$\alpha$-dihydroxy-pregnene—and substance S—the $\Delta^4$-3,20-diketo-17$\alpha$,21-dihydroxy-pregene—are 17,20-hydroxy-ketones. Various processes for the preparation of these compounds are known. Thus, for example, they may be prepared by treating the corresponding $\Delta^{17,20}$-21-acetoxy-pregnene compounds with hydroxylating agents, such as osmium tetroxide, followed by partial oxidation of the obtained 17,20,21-triols. However, this process requires at least 3 stages for the preparation of the desired 17,20-hydroxy-ketones. Moreover, the yields—particularly in the last step—are very unsatisfactory.

A primary object of the present invention is the embodiment of a process for the preparation of the said 17,20-hydroxyketones, which is free of the disadvantages of the prior art processes. A further object is the preparation of new 17,20-hydroxyketones of the recited type. These objects are realized by the present invention, according to which the desired 17,20-hydroxyketones are directly obtained by subjecting a pregnene compound containing the grouping

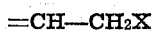

$$=CH-CH_2X$$

in the 17-position—X standing for a free, esterified or etherified hydroxy group—to the action of a metallic oxide, which is capable of adding onto a carbon-to-carbon double bond, and of a peroxide compound, and isolating the formed 17,20-hydroxyketone from the reaction mixture. In this way, essentially better yields are obtained than are realizable according to the known processes and, moreover, only one reaction stage is required.

The starting materials are preferably esterified or etherified 21-hydroxy-pregnene compounds, for example those which contain in 21-position an acyloxy group, such for instance as acetoxy, propionyloxy, succinyloxy, benzoyloxy, tosyloxy, etc. or a halogen atom, or an alkoxy group, such for instance as methoxy, ethoxy, etc., or a hydroxy group etherified with a sugar radical, such as the radical of d-glucose, galactose, maltose, lactose, etc. The starting materials may additionally be substituted in the 5-, 6-, 7-, 12- and, more particularly, in the 3- and 11-positions, for example by free or functionally converted oxo or hydroxy groups, as for instance by acyloxy groups, such as acetoxy, propionyloxy, benzoyloxy, tosyloxy, etc. groups or halogen atoms, by alkoxy groups such as methoxy or ethoxy groups, etc., or by epoxy groups, for example in the 3,9-position. Moreover, they may also contain a double bond in the 3-, 4-, 5-, 9- and/or 11-position. If necessary, any such double bond may be intermediarily protected in known manner, for instance by saturation with halogen or hydrogen halide or by conversion into pentacyclic isosteroids.

The metal oxides which are capable of adding onto a carbon-to-carbon double bond are particularly those of the higher valence stages of the heavy metals of groups 5 to 8 of the periodic system; for example osmium tetroxide, further also tungsten trioxide. The preferred peroxide compound is hydrogen peroxide. Other suitable peroxide compounds are the organic peroxides such as alkyl peroxides or per-acids, such as monoperformic acid, monoperacetic acid, monoperpropionic acid, monoperbutyric acid, monoperbenzoic acid or monoperphthalic acid. The reaction is advantageously carried out in an anhydrous or aqueous diluent. Particularly suitable as diluents are the tertiary carbinols, such for instance as tert. butanol, and also ethers, lower fatty acid esters and chlorinated hydrocarbons, such as methylene chloride and carbon tetrachloride.

The products of manufacture may be used as medicaments or as intermediates. Some of them are new. Thus, $\Delta^4$-3,20-diketo-17$\alpha$-hydroxy-21-halogen-pregnenes, for example $\Delta^4$-3,11,20-triketo-17$\alpha$-hydroxy-21-bromo-pregnene or $\Delta^4$-3,20-diketo-17$\alpha$-hydroxy-21-bromo-pregnene, are new compounds which are of great importance as intermediates in the manufacture of therapeutically active substances.

The invention is set forth in greater detail in the following illustrative examples. In the latter, the relationship between parts by weight and parts by volume is the same as that which exists between the gram and the cubic centimeter. Temperatures are in degrees centigrade. Percentages are by weight.

*Example 1*

7.15 parts by weight of $\Delta^{4,17}$-3-keto-21-acetoxypregnadiene are dissolved in 300 parts by volume of ether, then 29.5 parts by volume of a 1.7-molar ethereal solution of hydrogen peroxide are added, and a solution of 0.51 part by weight of osmium tetroxide in 100 parts by volume of ether is slowly added dropwise with stirring.

After a reaction period of 48 hours, the reaction mixture is diluted with ether, the solution shaken out several times with water in order to remove excess hydrogen peroxide, then dried with sodium sulfate, filtered and evaporated.

The residue is dissolved in 250 parts by volume of methanol, a solution of 3 parts by weight of sodium sulfite in 50 parts by volume of water is added, and the mixture is boiled for 1 hour under reflux. The reaction product is then extracted from the cooled mixture with a large quantity of ether, and the ethereal solution then washed several times with water, dried with sodium sulfate, filtered and the solvent distilled off.

In order to re-acetylate the crude product, which is partially saponified in 21-position, the residue is dissolved in 50 parts by volume of anhydrous pyridine and then admixed with 30 parts by volume of acetic anhydride. After standing for 16 hours at 20–25°, the solution is evaporated to complete dryness under vacuum at a bath temperature of 35–40°. From the reaction product, by crystallization from ether, there is obtained crude $\Delta^4$-3,20-diketo-17$\alpha$-hydroxy-21-acetoxy-pregnene which, after a single recrystallization from acetone-ether, melts at 236–238° (with decomposition), $[\alpha]_D^{25} = +120° \pm 4°$ ($c = 0.539$ in acetone).

A further quantity of pure $\Delta^4$-3,20-diketo-17$\alpha$-hydroxy-21-acetoxy-pregnene is obtained from the mother liquor by adsorption on aluminum oxide.

Example 2

3.565 parts by weight of $\Delta^{4,17}$-3-keto-21-acetoxy-pregnadiene are dissolved in 50 parts by volume of tert. butanol, and then 13.5 parts by volume of a 1.5-molar solution of hydrogen peroxide in tert. butanol are added. While stirring constantly, 10 parts by volume of a solution of 0.255 part by weight of osmium tetroxide in 25 parts by volume of tert. butanol are added in the course of 5 minutes, the remainder being added in portions of 1 part by volume each at intervals of 2 hours each. After stirring the reaction mixture for an additional 36 hours at 25°, it is diluted with 200 parts by volume of water and the oxidation product is taken up in methylene chloride. The combined methylene chloride solutions are washed with 5% ferrous sulfate solution and water, dried with sodium sulfate and evaporated.

The partly crystalline residue is dissolved in 125 parts by volume of methanol, then a solution of 1.5 parts by weight of 85% sodium sulfite in 25 parts by volume of water is added, and the solution boiled for a half hour under reflux. The cooled mixture is diluted with 200 parts by volume of water, the organic substance taken up in methylene chloride, and the combined methylene chloride solutions washed several times with water, dried with sodium sulfate and evaporated.

The residue is dissolved in 12.5 parts by volume of anhydrous pyridine, 7.5 parts by volume of acetic anhydride are then added, and the mixture, from which crystals begin to separate in a few minutes, is allowed to stand for 16 hours at 20°. The readily volatile substances are then distilled off at a bath temperature of 40–50° under a water-jet vacuum, and the residue is stirred up with 5 parts by volume of ether. After standing for several hours, the brown-colored mother liquor is subjected to suction filtration, and the separated crystals are washed with a small quantity of ether. By a single recrystallization from acetone, the $\Delta^4$-3,20-diketo-17$\alpha$-hydroxy-21-acetoxy-pregnene of the formula

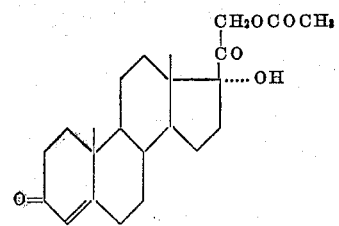

is obtained in the form of colorless prisms which melt at 236–238° and have a specific rotation $[\alpha]_D^{25} = +121° \pm 4°$ ($c = 0.515$ in acetone).

By carrying out the oxidation procedure described in this example with a $\Delta^{4,17}$-3-keto-pregnadiene substituted in the 21-position by propionyloxy, succinyloxy or benzoyloxy, the 21-propionyloxy-, 21-succinyloxy-, or 21-benzoyloxy-$\Delta^4$-3,20-diketo-17$\alpha$-hydroxy-pregnene, respectively, is obtained.

Example 3

3.565 parts by weight of $\Delta^{4,17}$-3-keto-21-acetoxy-pregnadiene are dissolved in 150 parts by volume of anhydrous ether, and then 29.5 parts by volume of a 1.7-molar ethereal solution of hydrogen peroxide are added, this corresponding to twice the molar proportion of hydrogen peroxide according to Example 1. While stirring constantly, 5 parts by volume of a solution of 0.255 part by weight of osmium tetroxide in 25 parts by volume of anhydrous ether are first added in the course of 5 minutes, and the remainder then added in portions of 1 part by volume each at intervals of 2 hours each. Upon completion of the addition, stirring is continued for a further 48 hours at room temperature.

The material is worked up after the manner described in Example 2. From the obtained crystalline fraction, there is recovered by a single recrystallization from acetone, pure $\Delta^4$-3,20-diketo-17$\alpha$-hydroxy-21-acetoxy-pregnene, melting at 236–238° and having a specific rotation $[\alpha]_D^{25} = +120° \pm 40$ ($c = 0.539$ in acetone).

Example 4

3.775 parts by weight of finely pulverized $\Delta^{4,17}$-3-keto-21-bromo-pregnadiene are dissolved in 100 parts by volume of tert. butanol, then 13.5 parts by volume of a 1.5-molar solution of hydrogen peroxide in tert. butanol are added, and then while constantly stirring a solution of 0.255 part by weight of osmium tetroxide in 25 parts by volume of tert. butanol is added within a period of 48 hours. Upon completion of the addition, stirring of the mixture is continued at room temperature for 96 more hours. The mixture is then diluted with 1000 parts by volume of water, after which it is extracted with large quantities of ether. The ether extracts are washed successively with water, 5% ferrous sulfate solution and water and then the combined ether solutions are shaken for 18 hours with a solution of 3.0 parts by weight of 85% sodium sulfite in 250 parts by volume of water. The aqueous phase is thereupon separated, the ether solution again washed with 250 parts by volume of 2% sodium sulfite solution and water and then dried with sodium sulfate. From the highly concentrated ether solution, the $\Delta^4$-3,20-diketo-17$\alpha$-hydroxy-21-bromo-pregnene of the formula

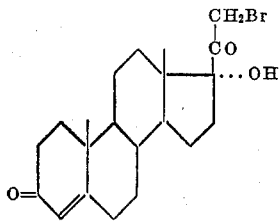

crystallizes out in finely granular form, upon standing. After a single recrystallization from methylene chloride or acetone, the pure bromo-ketol is obtained as colorless granules which melt at 187–189° with decomposition.

$[\alpha]_D^{25} = +129° \pm 4°$ ($c = 1.013$ in dioxane)

If the oxidation is carried out with $\Delta^{4,17}$-3-keto-21-chloro-pregnadiene the $\Delta^4$-3,20-diketo-17$\alpha$-hydroxy-21-chloro-pregnene is formed. Analogous compounds may also be used, which carry in 11 or 12-position a substituent such as a keto group. In this manner, $\Delta^4$-3,11,20-triketo-17$\alpha$-hydroxy-21-bromo-pregnene may be obtained.

150 parts by volume of dry acetone are poured over 1.05 parts by weight of $\Delta^4$-3,20-diketo-17$\alpha$-hydroxy-21-bromo-pregnene and 9.82 parts by weight of finely pulverized anhydrous potassium acetate and the mixture boiled for 1 hour. The solvent is then evaporated in vacuo and the residue is extracted with ether, after the addition of water. The ether extracts are washed with 2% sodium bicarbonate solution and water, dried with sodium sulfate, and the ether distilled off. By recrystallization of the crude product from acetone, there is obtained the previously-described $\Delta^4$-3,20-diketo-17$\alpha$-hydroxy-21-acetoxy-pregnene which melts at 236–238°.

*Example 5*

3.725 parts by weight of $\Delta^{17}$-3,11-diketo-21-acetoxy-pregnene are dissolved in 150 parts by volume of 0.2-molar hydrogen peroxide in tert. butanol. To the resultant solution, there is added, within a period of 32 hours and while stirring, a solution of 0.255 part by weight of osmium tetroxide in 25 parts by volume of tert. butanol. Stirring is continued at 25–30° for an additional 48 hours, following the completion of the addition of the osmium tetroxide. After dilution with 150 parts by volume of methylene chloride, the reaction mixture is shaken with a solution of 3 parts by weight of 85% sodium sulfite in 75 parts by volume of water for 24 hours, then diluted with water, and extracted several times with methylene chloride. The methylene chloride solutions are washed thoroughly with water, dried with sodium sulfate and evaporated.

In order to re-acetylate the reaction product, which is partly saponified in the 21-position, the residue is dissolved in 12.5 parts by volume of anhydrous pyridine and admixed with 7.5 parts by volume of acetic anhydride. After standing for 16 hours, the reaction mixture is evaporated under vacuum at room temperature, the residue taken up in methylene chloride, and the solution washed successively with 1-normal hydrochloric acid, 0.5-normal sodium bicarbonate solution and water. After drying with sodium sulfate, the methylene chloride is distilled off and the residue chromatographed over aluminum oxide. Part of the oxidation product is extracted with benzene and mixtures of benzene and ether. From the fractions dissolved out with pure ether and mixtures of ether and acetone, there is recovered, after recrystallization from acetone-ether, pure 3,11,20-triketo-17$\alpha$-hydroxy-21-acetoxy-pregnane of the formula

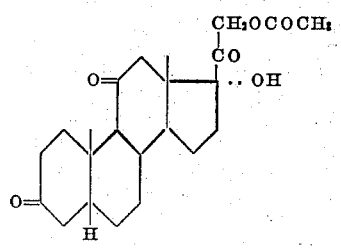

as colorless crystals which melt at 232–234° (with discoloration and which have a specific rotation $[\alpha]_D^{23} = +87° \pm 4°$ ($c = 0.524$ in acetone).

The specified process may also be carried out with $\Delta^{4,17}$-3-keto-pregnadiene carrying an etherified hydroxy group in 21-position. Thus, as a result of the oxidation of $\Delta^{4,17}$-3-keto-21-methoxy-pregnadiene and $\Delta^{4,17}$-3-keto-21-benzyloxy-pregnadiene, $\Delta^4$-3,20-diketo-17$\alpha$-hydroxy-21-methoxy-pregnene and $\Delta^4$-3,20-diketo-17$\alpha$-hydroxy-21-benzyloxy-pregnene are obtained.

*Example 6*

3.145 parts by weight of $\Delta^{4,17}$-3-keto-21-hydroxy-pregnadiene are dissolved in 50 parts by volume of tert. butanol, whereupon 12.1 parts by volume of a 1.66-molar solution of hydrogen peroxide in tert. butanol are added. While stirring constantly, 10 parts by volume of a solution of 0.255 part by weight of osmium tetroxide in 25 parts by volume of tert. butanol are added in the course of 3 minutes, the remainder being added within the course of 30 hours. In order to complete the reaction, the mixture is then stirred for an additional 32 hours. It is then diluted with 250 parts by volume of methanol, admixed with a solution of 3 parts by weight of 85% sodium sulfite in 65 parts by volume of water, and boiled 30 minutes under reflux. After cooling to 30–40°, the organic solvents are distilled off under vacuum while 250 parts by volume of water are added, and the reaction mixture is taken up in methylene chloride. The methylene chloride solution is washed a number of times with water, dried with sodium sulfate, and evaporated.

The thus obtained $\Delta^4$-3,20-diketo-17$\alpha$,21-dihydroxy-pregnene is, as described in Example 2, acetylated and further worked up. By recrystallization from a small quantity of acetone and recrystallization from acetone-ether, there is obtained pure $\Delta$3,20-diketo-17$\alpha$-hydroxy-21-acetoxy-pregnene which melts at 236–238° and has a specific rotation $[\alpha]_D^{22} = +124° \pm 4°$ ($c = 0.502$ in acetone).

*Example 7*

0.128 part by weight of osmium tetroxide is added to a solution of 1.783 parts by weight of $\Delta^{4,17}$-3-keto-21-acetoxy-pregnadiene in 60 parts by volume of ether. While stirring, 46 parts by volume of a 0.217-molar solution of monoperphthalic acid in ether are allowed to flow in in the course of 6 hours. When the addition is complete, stirring is continued for 46 hours, then the reaction mixture is diluted with 100 parts by volume of methanol and shaken for 12 hours with a solution of 1.5 parts by weight of sodium sulfite of 85 per cent. strength in 100 parts by volume of water. The organic solvents are removed in vacuo, the oxidation product is taken up in 500 parts by volume of ether and the ether solutions are washed consecutively with an acidified 0.5-molar solution of potassium iodide, water, a 0.5-molar solution of sodium thiosulfate, a 0.5-molar sodium carbonate solution and water. The combined ether solutions are dried with sodium sulfate, filtered and evaporated. The residue is dissolved in 7.5 parts by volume of anhydrous pyridine and mixed with 4.5 parts by volume of acetic anhydride. After 14 hours' standing with the exclusion of moisture, the whole is evaporated at 45° under a water-jet vacuum and the acetylation product which is in part crystalline is stirred with ether. After filtering with suction and recrystallization from acetone the $\Delta^4$-3,20-diketo-17α-hydroxy-21-acetoxy-pregnene is obtained in colorless prisms of M. P. 236–238°.

Instead of monoperphthalic acid, perbenzoic acid may be used in this example.

Example 8

A solution of 7.13 parts by weight of $\Delta^{4,17}$-3-keto-21-acetoxy-pregnadiene in 50 parts by volume of tertiary butanol is treated with 20.5 parts by volume of a 1.95-molar solution of tertiary butyl hydroperoxide in tertiary butanol. While stirring, a solution of 0.51 part by weight of osmium tetroxide in 25 parts by volume of tertiary butanol is added within 30 hours. Stirring is continued for another 60 hours whereupon the reaction mixture is carefully diluted with 30 parts by volume of water. The separated crystals are washed with 75% aqueous tertiary butanol in a suction-filter apparatus. From the dried crude product, there is obtained, after a single recrystallization from acetone and decoloration by means of activated charcoal, the $\Delta^4$-3,20-diketo-17α-hydroxy-21-acetoxy-pregnene in colorless prisms of M. P. 236–238°.

Example 9

A solution of 2.015 parts by weight of $\Delta^{17}$-3β,21-diacetoxy-allopregnene in 100 parts by volume of tertiary butanol is mixed with 10.2 parts by volume of a 1.47-molar solution of hydrogen peroxide in tertiary butanol. While stirring, a solution of 0.128 part by weight of osmium tetroxide in 25 parts by volume of tertiary butanol is added within 5 hours. Stirring is continued for another 48 hours to complete the reaction. The reaction mixture is then diluted with 100 parts by volume of methanol and shaken for 16 hours with a solution of 1.5 parts by weight of sodium sulfite of 85 per cent. strength in 100 parts by volume of water. The organic solvents are thereupon completely distilled off while allowing 75 parts by volume of water to flow in and the oxidation product is taken up in ether. The ether solutions are consecutively washed with water, 2% sodium hydrogen carbonate solution and water, dried and evaporated.

The residue is dissolved in 12.5 parts by volume of anhydrous pyridine and mixed with 7.5 parts by volume of acetic anhydride. The solution is allowed to stand for 16 hours with the exclusion of moisture. The crude acetylation product isolated by conventional means is chromatographed in a benzene solution over 50 parts by weight of aluminum oxide. After the removal of easily separable portions with benzene, there is obtained by elutriation with ether and subsequent recrystallization from a mixture of benzene and methanol the 3β,21-diacetoxy-17α-hydroxy-20-keto-allopregnane (diacetate of Reichstein's substance P) of the formula

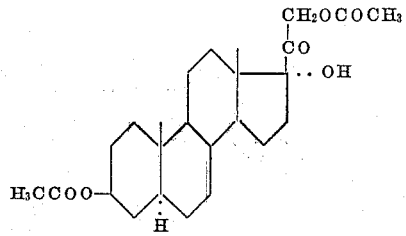

in colorless needles of M. P. 206–208° and of specific rotation $[\alpha]_D^{21} = +46 \pm 4°$ (c=0.928 in chloroform).

In an analogous manner, there are obtained by starting from other $\Delta^{17}$-3β,21-diacyloxy-allopregnenes the corresponding 3β,21-diacyloxy-17α-hydroxy-20-keto-allopregnenes, such as, for example, 3β,21-dipropionyloxy-17α-hydroxy-20-keto-allopregnene from $\Delta^{17}$-3β,21-dipropionyloxy-allopregnene. Alternatively, $\Delta^{17}$-21-acyloxy-pregnenes carrying a free hydroxy group in 3-position may also be employed in the process.

Example 10

15 parts by volume of a 0.135-molar solution of hydrogen peroxide in tertiary butanol are poured on 0.372 part by weight of $\Delta^{4,17}$-3-keto-11β-hydroxy-21-acetoxy-pregnadiene. Upon occasional agitation within 8 hours, a solution of 0.026 part by weight of osmium tetroxide in 4 parts by volume of tertiary butanol is added. After a further 48 hours' standing, the reaction mixture is diluted with 20 parts by volume of methanol, mixed with a solution of 0.3 part by weight of sodium sulfite of 85 per cent. strength in 20 parts by volume of water and shaken for 16 hours. The organic solvents are then distilled off in vacuo at 40°, the oxidation product is taken up in methylene chloride, the methylene chloride solutions are consecutively washed with water, 2% sodium hydrogen carbonate solution and water, dried with sodium sulfate and evaporated.

The residue is dissolved in 10 parts by volume of anhydrous methylene chloride, treated with 2.5 parts by volume of dry pyridine and the solution cooled in ice water mixed with 1.5 parts by volume of acetic anhydride. After 16 hours' standing at 0°, it is shaken with ice and dilute hydrochloric acid, diluted with a further quantity of methylene chloride, thoroughly washed with water and then with 2% sodium hydrogen carbonate solution and water, dried and evaporated. The crude acetylation product is dissolved in benzene and chromatographed over 10 parts by weight of Florida bleaching earth.

As eluating agents, mixtures of benzene and ether, ether and chloroform, and chloroform and methanol are used. The fractions, melting between 205 and 218° and capable of considerably reducing silver diamine solution, are united and again purified by adsorption on Florida bleaching earth. The oxidation product which is thus freed from slightly reducing accompanying substances is recrystallized from a mixture of ethyl acetate and ether and from acetone whereby the $\Delta^4$-3,20-diketo-11β,17α-dihydroxy-21- acetoxy-pregnene (acetate of Reichstein's substance M) of the formula

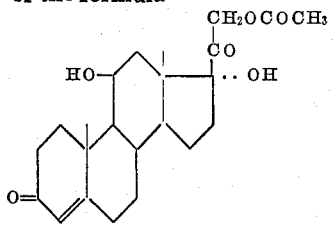

is obtained in colorless prisms of M. P. 220–222° and of specific rotation $[\alpha]_D^{22} = +148 \pm 4°$ (c=0.434 in acetone).

What is claimed is:

1. A process for the preparation of a 17,20-hydroxy-ketone of the pregnane series, which comprises subjecting a pregnene having the grouping =CH—CH₂X in the 17-position, X representing a member selected from the group consisting of free, esterified and etherified hydroxyl, with osmium tetraoxide and with a member selected from the group consisting of hydrogen peroxide, an alkyl peroxide and a peracid, and isolating the resultant 17,20-hydroxxy-ketone from the reaction mixture.

2. A process for the preparation of a 17,20-hydroxy-ketone of the pregnane series, which comprises subjecting a Δ⁴-3-keto-pregnene having the grouping =CH—CH₂X in the 17-position, X representing a member selected from the group consisting of free, esterified and etherified hydroxyl, with osmium tetroxide and with a member selected from the group consisting of hydrogen peroxide, an alkyl peroxide and a peracid, and isolating the resultant 17,20-hydroxy-ketone from the reaction mixture.

3. A process for the preparation of a 17,20-hydroxy-ketone of the pregnane series, which comprises subjecting a 3-acyloxy-pregnene having the grouping =CH—CH₂X in the 17- position, X representing a member selected from the group consisting of free, esterified and etherified hydroxyl, with osmium tetroxide and with a member selected from the group consisting of hydrogen peroxide, an alkyl peroxide and a peracid, and isolating the resultant 17,20-hydroxy-ketone from the reaction mixture.

4. A process for the preparation of a 17,20-hydroxy-ketone of the pregnane series, which comprises subjecting a 3,11-diketo-pregnene having the grouping =CH—CH₂X in the 17-position, X representing a member selected from the group consisting of free, esterified and etherified hydroxyl, with osmium tetroxide and with a member selected from the group consisting of hydrogen peroxide, an alkyl peroxide and a peracid, and isolating the resultant 17,20-hydroxy-ketone from the reaction mixture.

5. A process for the preparation of a 17,20-hydroxy-ketone of the pregnane series, which comprises subjecting a Δ⁴,¹⁷-3-keto-21-acetoxy-pregnadiene with osmium tetroxide and with a member selected from the group consisting of hydrogen peroxide, an alkyl peroxide and a peracid, and isolating the resultant 17,20-hydroxy-ketone from the reaction mixture.

6. A process for the preparation of a 17,20-hydroxy-ketone of the pregnane series, which comprises subjecting a pregnene having the grouping =CH—CH₂X in the 17-position, X representing a member selected from the group consisting of free, esterified and etherified hydroxyl, with osmium tetroxide and hydrogen peroxide, and isolating the resultant 17,20-hydroxy-ketone from the reaction mixture.

7. The Δ⁴-3,20 - diketo - 17α - hydroxy - 21-halogen-pregnenes.

8. The Δ⁴-3,20-diketo-17α-hydroxy-21-bromo-pregnene, melting at about 187–189° with decomposition.

KARL MIESCHER.
JULIUS SCHMIDLIN.

References Cited in the file of this patent

UNITED STATES PATENTS

| Number | Name | Date |
|---|---|---|
| 2,228,706 | Reichstein | Jan. 14, 1941 |
| 2,275,790 | Miescher | Mar. 10, 1942 |
| 2,437,564 | Serini | Mar. 9, 1948 |
| 2,492,194 | Sarett | Dec. 27, 1949 |
| 2,596,563 | Kaufmann | May 13, 1952 |

OTHER REFERENCES

Salmon, Helv. Chem. Acta. 30, 1616–1635 (1947).